United States Patent [19]

Jones et al.

[11] Patent Number: 4,905,465
[45] Date of Patent: Mar. 6, 1990

[54] ROTARY CUTTING MEMBER FOR USE WITH LAWN MOWERS AND THE LIKE

[75] Inventors: Dallas W. Jones, New Hartford, N.Y.; Matthew F. Orr, Shawnee Mission, Kans.

[73] Assignee: Trim-A-Lawn Corporation, Elmira, N.Y.

[21] Appl. No.: 350,346

[22] Filed: May 8, 1989

[51] Int. Cl.⁴ .................. A01D 34/64; A01D 34/73; A01D 50/00; B26B 27/00
[52] U.S. Cl. .................................. 56/295; 30/276; 56/12.7; 428/397
[58] Field of Search .............. 56/12.7, 295, 29, 198, 56/377, DIG. 17, DIG. 20; 30/276, 347, 349; 15/180, 182; 428/397, 400, 399

[56] References Cited

U.S. PATENT DOCUMENTS

| | | | |
|---|---|---|---|
| 3,208,209 | 9/1965 | Dunlap et al. | 56/295 |
| 4,054,992 | 10/1977 | Ballas et al. | 30/276 |
| 4,054,993 | 10/1977 | Kamp et al. | 30/276 |
| 4,062,115 | 12/1977 | Lee | 30/276 |
| 4,118,865 | 10/1978 | Jacyno et al. | 30/276 |
| 4,126,990 | 11/1978 | Fisher et al. | 56/295 |
| 4,126,991 | 11/1978 | Gobin et al. | 56/12.7 X |
| 4,186,391 | 1/1980 | Mize et al. | 56/12.7 X |
| 4,189,830 | 2/1980 | Pittinger, Jr. | 56/12.7 X |
| 4,232,505 | 11/1980 | Walto | 56/12.7 |
| 4,357,789 | 11/1982 | Rodish | 56/295 |
| 4,362,007 | 12/1982 | Kennedy et al. | 56/295 |
| 4,461,138 | 7/1984 | Whitman | 56/12.7 |
| 4,513,563 | 4/1985 | Roser et al. | 56/295 |
| 4,644,655 | 2/1987 | Bottamiller et al. | 56/12.7 X |
| 4,726,176 | 2/1988 | McGrew | 56/12.7 |

Primary Examiner—Stephen J. Novosad
Attorney, Agent, or Firm—Shlesinger & Myers

[57] ABSTRACT

A rotary cutting member for use with lawn mowers and the like includes a continuous rim having at least three stepped openings at different elevations relative to the ground for securing at least three flexible cutting filaments to the rim, thereby providing at least three cutting planes when the rotary member is rotating.

21 Claims, 3 Drawing Sheets

ROTARY CUTTING MEMBER FOR USE WITH LAWN MOWERS AND THE LIKE

RELATED APPLICATIONS

The Assignee of the present invention is the owner of the following copending U.S. patent applications related to the present invention: Ser. No. 07/245,969, now U.S. Pat. No. 4,854,115, APPARATUS FOR CUTTING GRASS AND THE LIKE, continuation of Ser. No. 07/080,269, now abandoned; Ser. No.: 07/156,957, A ROTARY CUTTING MEMBER FOR USE WITH LAWN MOWERS AND THE LIKE, now U.S. Pat. No. 4,819,416; Ser. No.: 07/152,583, A HOUSING FOR LAWN TRIMMERS AND THE LIKE; Ser. No.: 07/188,508, AN APPARATUS FOR TRIMMING LAWNS AND THE LIKE; Ser. No.: 07/199,359, ROTARY CUTTING MEMBER WITH FLEXIBLE FILAMENTS FOR USE WITH LAWN MOWERS AND THE LIKE; and Ser. No.: 07/275,560, A HOUSING FOR LAWN TRIMMERS AND THE LIKE.

FIELD OF THE INVENTION

The present invention pertains to a rotary cutting member for use with lawn mowers and the like, and particularly to rotary cutting members with flexible filaments.

BACKGROUND OF THE INVENTION

It is well known that conventional lawn mowers have the potential of inflicting great bodily harm or loss of life to the operator or nearby person. The metallic cutting blade customarily used in lawn mowers can permanently disfigure, or injure the operator or an innocent bystander. There are several situations where this may happen. For example, if the operator should slip and fall, a part of his body, such as a foot or an arm, may accidently get underneath the lawn mower with grave consequences. In a case involving a self-propelled lawn mower, loss of control by the operator might cause the lawn mower to run away from the operator and injure another person. Lawn mowers are also known to have started on their own without any warning. For example, an operator cleaning under the lawn mower housing or fixing the blade might be injured when, without any warning, the lawn mower starts on its own. There are also cases where the operator or a nearby person has been hit by projectiles such as rocks, bottles, pieces of wood, etc., propelled by the lawn mower blade. Furthermore, lawn mowers are sometimes subjected to abuse wherein it is put to use for which is not intended, creating potential hazard to the operator. A case like this might involve the operator bodily lifting up the lawn mower and using it as a hedge trimmer.

To make the lawn mower safer to use, flexible cutting filaments have been used to replace the standard metallic blades. Use of flexible cutting filaments, however, has resulted in reduced cutting power, since the flexible cutting filaments have less angular momentum than a standard metallic blade. Also, rotary members used for holding the flexible cutting filaments include rigid arms or projections which have the potential of hurting or injuring an unwary operator or bystander. Therefore, there is a need for flexible cutting means which have sufficient angular momentum and without potentially injuring projecting arms.

OBJECTS AND SUMMARY OF THE INVENTION

It is therefore an object of the present invention to provide an improved rotary cutting member for use with lawn mowers and the like.

It is another object of the invention to provide a rotary cutting member that will relatively reduce the danger of bodily harm associated with the use of lawn mowers and the like.

It is a further object of the present invention to provide a rotary cutting member having a plurality of flexible cutting filaments for reducing wear and tear on the individual cutting filament.

It is still an object of the present invention to provide a rotary cutting member having a plurality of flexible cutting filaments securable at different elevations above the ground, thereby providing a plurality of cutting heights.

It is also an object of the present invention to provide a rotary cutting member having a plurality of flexible cutting filaments which can be configured in various ways to provide optimum cutting characteristics for the type of vegetation being cut.

It is an object of the present invention to provide a rotary cutting member which has a relatively higher angular moment of inertia for opposing and moderating changes in speed of the lawn mower engine.

It is another object of the present invention to provide a rotary cutting member which maintains a relatively constant speed for assuring an even cut of the entire lawn.

It is yet another object of the present invention to provide a rotary cutting member with concentrated mass at is periphery for creating a fly-wheel effect when rotating, thereby requiring less power from the engine to maintain a constant speed.

It is a further object of the present invention to provide a rotary cutting member without any rigid projections which might catch and injure any of the operator's body parts.

It is yet another object of the present invention to provide a rotary cutting blade with a smooth periphery for thereby reducing the potential for serious bodily injury from accidental contact with the rotary cutting member.

It is yet a further object of the present invention to provide a rotary cutting member creating upward air flow therebetween.

It is yet another object of the present invention to provide a rotary cutting member that creates an upward suction for standing the vegetation before being cut.

It is still another object of the present invention to provide a rotary cutting member having means for mulching the cut vegetation.

It is another object of the present invention to provide a rotary cutting member having readily replaceable flexible cutting filaments.

In summary, the present invention provides an apparatus for cutting grass and the like, which is relatively safe to use, and which includes a plurality of flexible cutting filaments securable at different elevations above the ground.

DETAILED DESCRIPTION OF THE DRAWINGS

DETAILED DESCRIPTION OF THE INVENTION

FIGS. 1, 2, 3 and 4

Figure 1:
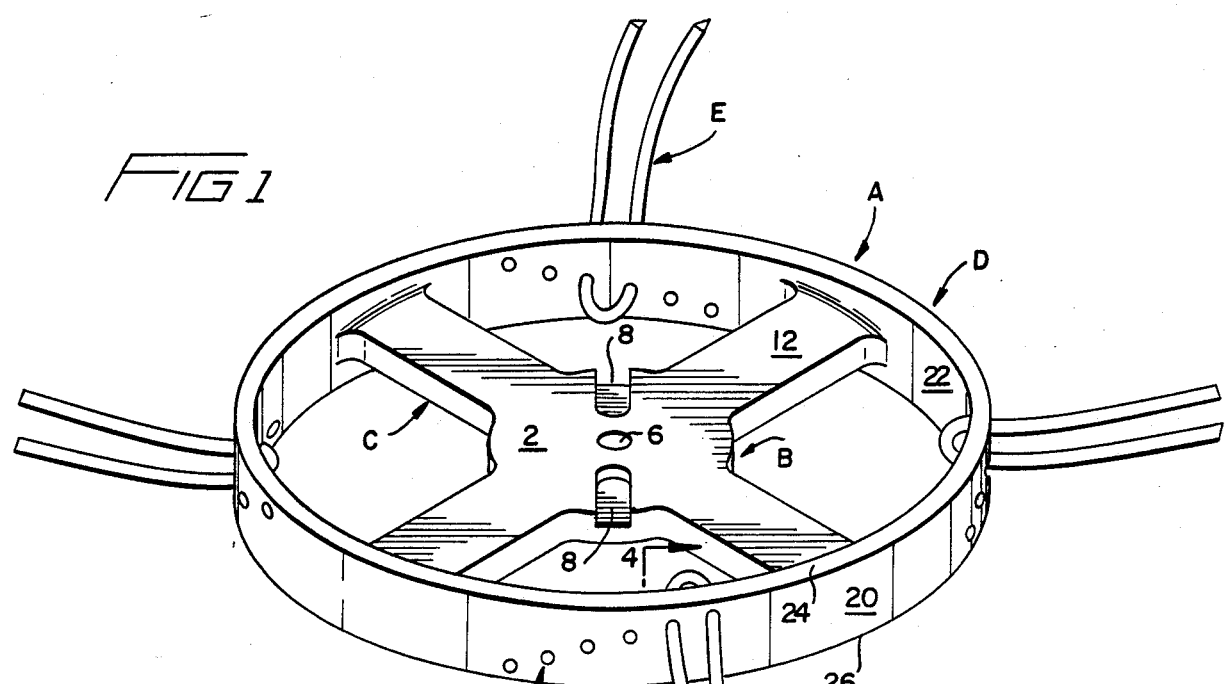
FIG. 1 is a perspective view of a rotary cutting device, including flexible cutting filaments, formed in accordance with the present invention.

A rotary cutting blade A includes a hub B, a plurality of arms C extending outwardly from and integral with hub B, a rim D integral with the outer periphery of arms C, and a plurality of flexible cutting filaments E associated with rim D, as best shown in FIG. 1. Rotary cutting blade A is preferably formed in one piece from cast metal.

Figure 3:
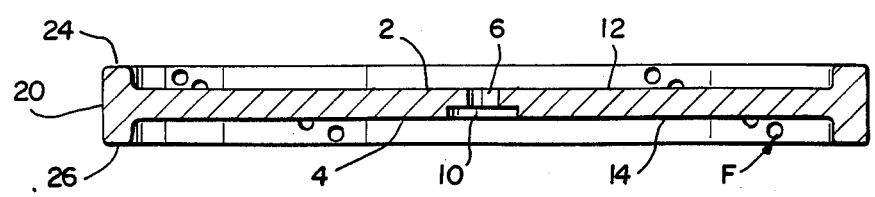
FIG. 3 is a cross-sectional, side-elevational view of the present inventio, taken along line 3—3 in FIG. 2.

Hub B includes an upper surface 2 and a lower surface 4, as best shown in FIGS. 1 and 3. Hub B includes an opening 6, a pair of radial slots 8 and a countersink 10, for mounting rotary cutting blade A to the output shaft of a lawn mower engine. Opening 6, slots 8, and countersink 10 may be modified to conform to the particular mounting requirements of a specific lawn mower. Thus, opening 6 may be smaller or larger, or additional holes may be bored through hub B, etc.

Arms C include an upper surface 12 and a lower surface 14 which are coplanar with upper surface 2 and lower surface 4, respectively, of hub B, as best shown in FIGS. 1 and 3. Arms C are equidistantly spaced about the outer periphery of hub B and each extends outwardly from hub B an equal distance. Each arm C is cantilevered from hub B such that each arm C is spaced from its respective adjacent arms C. Each arm C includes a first portion 16 adjacent to hub B and a second portion 18 removed from hub B and associated with rim D.

Figure 2:
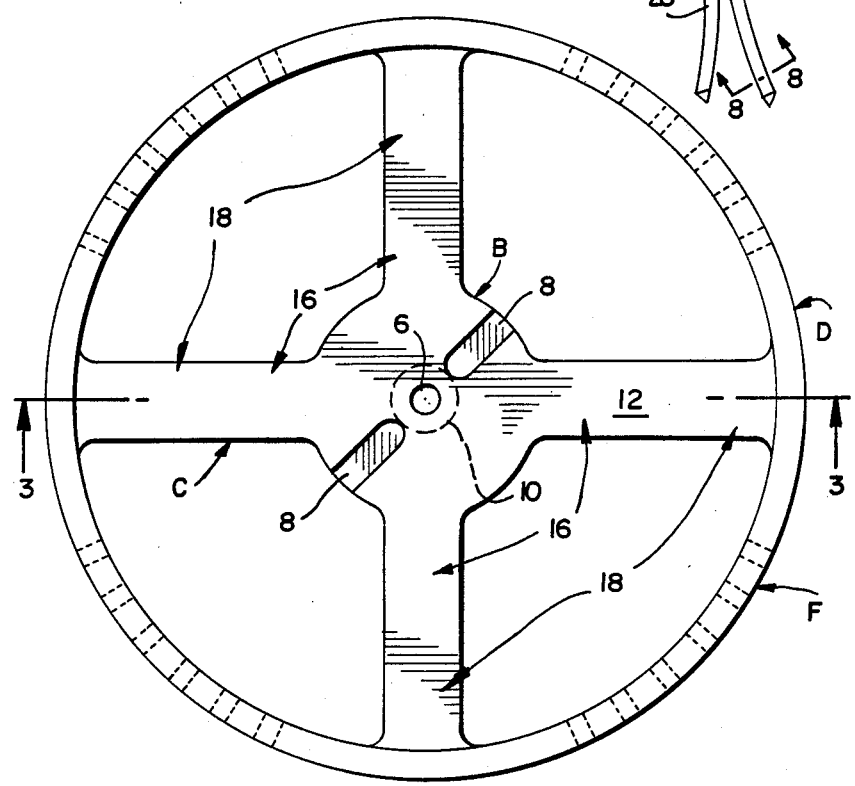
FIG. 2 is a top plan view of FIG. 1, with the flexible cutting filaments not shown.

Rim D is integral with the second portion 18 of each arm C. Rim D is in a shape of a ring having an outer vertical cylindrical surface 20, an inner vertical cylindrical surface 22, and upper edge 24 and a lower edge 26, as best shown in FIGS. 1, 2 and 3. Rim D is integral with each second portion 18 of each arm C at the inner vertical cylindrical surface 22.

Figure 4:
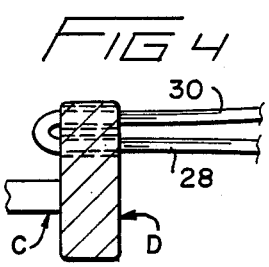
FIG. 4 is a fragmentary, cross-sectional view of the present invention, taken along line 4—4 in FIG. 1.

Groups of holes F are disposed circumferentially along rim D between adjacent arms C. Holes F extend outwardly radially through surfaces 20 and 22 of rim D. Holes F are further disposed in an ascending, stepped, configuration between the lower edge 26 and the upper edge 24 of rim D in a counter-clockwise direction, as viewed in FIG. 1, such that the lower holes are leading the higher holes when the rotary cutting blade A is rotating in a counter-clockwise direction. Each hole F is, therefore, spaced from its adjacent hole vertically and circumferentially, as best shown in FIGS. 1 and 4. Although holes F are shown configured in a specific arrangement, it will be understandable to a person skilled in the art that the holes F may be arranged in almost any configuration, depending on the desired characteristic for flexible cutting filaments E when secured to the holes F. For example, the holes F could be arranged in a descending, stepped, configuration, such that the upper holes are leading the lower holes when the rotary cutting blade A is rotating in a counter-clockwise direction.

Arms C could be any number. Shown in FIG. 1 is an embodiment having four arms C equally disposed around hub B and extending radially therefrom. Arm C divide rim D into four equal arc segments. Each arc segment includes holes F equally spaced circumferentially and vertically from each other in an ascending configuration from the lower edge 26 to the upper edge 24 of rim D, in a counterclockwise direction, as viewed in FIG. 1. Holes F secure flexible cutting filaments E, as best shown in FIGS. 1 and 4.

Rim D advantageously concentrates the mass of rotary cutting blade A to provide a maximum angular moment of inertia for rotary cutting blade A. The moment of inertia is proportional to the weight of the particles of the cutting blade A and the square of their distance from the axis of rotation. Thus, by concentrating the weight of the cutting blade A in the rim D which is furthest away from hub B, the moment of inertia of the rotary cutting blade A is maximized. The greater the moment of inertia of the cutting blade A, the less susceptible it is to changes in speeds. Thus, the rotary cutting blade A helps to smooth out the energy fluctuation from the engine of the lawn mower and helps prevent the cutting blade A from slowing down considerably when it encounters heavy vegetation.

Upper surfaces 2 and 12 and lower surfaces 4 and 14 of hub B and arms C, respectively, are contained within the limits of the upper edge 24 and lower edge 26 of rim D. Hub B and arms C are also coplanar and flush with each other.

Since the second portions 18 of arms C are enclosed by rim D, arms C are precluded from catching an object or a part of the body of an operator or bystander accidently shoved in the path of cutting blade A. An object encountered by rotary cutting blade A will simply brush against rim D ad will not come into contact with radiating arms C. It is seen, then, that rim D acts as a safety guard for arms C, in addition to providing the maximum angular moment of inertia for cutting member A. Since upper surfaces 2 and 12 and lower surfaces 4 and 14 of hub B and arm C are coplanar, there are no vertically protruding parts from hub B and arms C which could catch and propel an object toward the operator or a nearby person, or worse, seriously injure a part of the body accidently placed in the path of the cutting blade A.

Flexible cutting filament E includes a first portion 28 inserted into a hole F and a second portion 30 inserted into an adjacent hole F such that first portion 28 and second portion 30 extend outwardly from rim D. Since the holes F are spaced vertically and circumferentially from each other, first portion 28 is lower than and circumferentially spaced from second portion 30, as best shown in FIGS. 1 and 4. When rotary cutting blade is rotating, first portion 28 is leading second portion 30, which helps provide an upward suction to permit the vegetation to stand up for being cut and to allow the cut vegetation to be mulched by trailing second portion 30. Also, trailing second portion 30 cuts any vegetation missed by leading lower portion 28, providing for a more relatively uniform cut.

Flexible cutting filament E may be secured to any pair of hole F along rim D. Since arms C are spaced from each other and holes F are spaced between adjacent arms C, there is a space between adjacent arms C and rim D to allow easy installation and replacement of flexible cutting filament E. Six holes F in each quadrant of rim D can accomodate up to three cutting filaments E in each quadrant, each filament E occupying a pair of adjacent holes F in the manner shown in FIG. 1. The number of holes F in rim D is only limited by the height of rim D defined between the lower edge 26 and the upper edge 24 and the vertical and horizontal separation between adjacent holes F.

Figure 5:
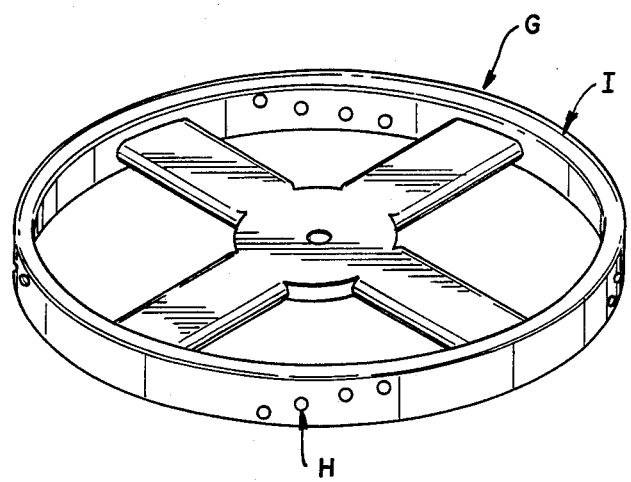
FIG. 5 is a perspective view of another embodiment of the present invention with the flexible cutting filaments not shown.
Figure 6:
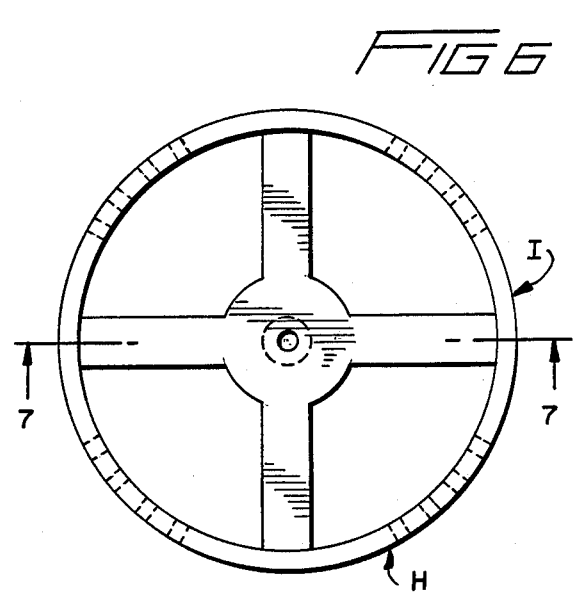
FIG. 6 is a top plan view of FIG. 5.
Figure 7:
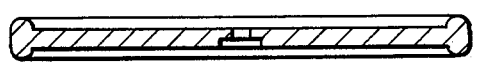
FIG. 7 is a cross-sectional, side-elevational view taken along line 7—7 in FIG. 6.

FIGS. 5, 6 and 7

A rotary cutting blade G is depicted in FIG. 5, which has substantially the same structure as rotary cutting blade A, except that rotary cutting blade G has fewer holes H in rim I than the number of holes F on rotary cutting blade A. Thus, rotary cutting blade G will accomodate a fewer number of flexible cutting filaments E than rotary cutting blade A. The advantages and features of rotary cutting blade G are the same as those for rotary cutting blade A. Flexible cutting filament E is substantially the same for both rotary cutting blade A and rotary cutting blade G. Rotary cutting blade G is also preferably made in one piece from cast metal.

Figure 10:
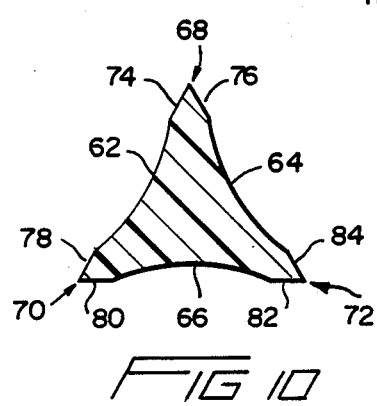
FIGS. 8, 9 and 10 are cross-sectional views, taken along line 8—8 in FIG. 1 of several embodiments of a flexible cutting filament of the present invention.
Figure 8:
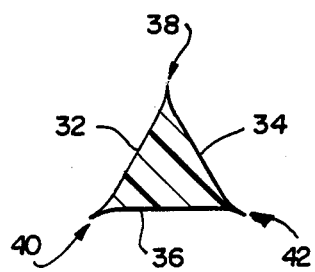
Figure 9:
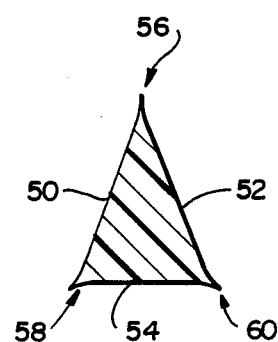
Figure 11:
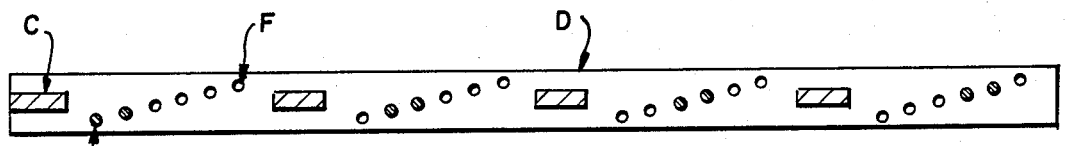
FIGS. 11 through 18 are flattened views, partly in cross-section, of the rim portion of the invention, shown in FIGS. 1 and 5.
Figure 12:
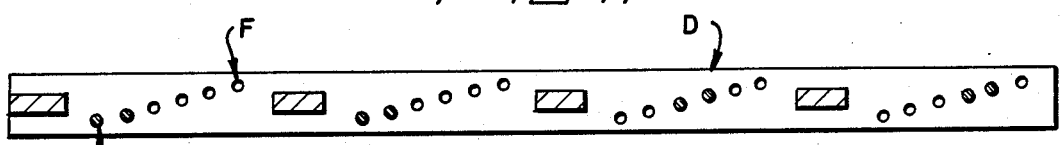
Figure 13:
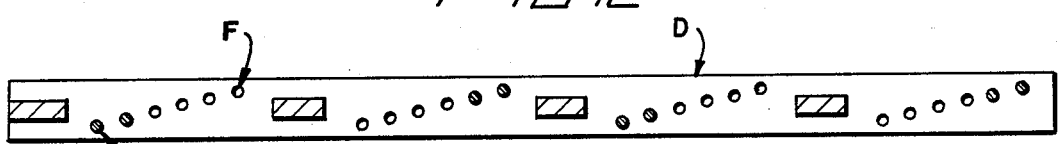
Figure 14:
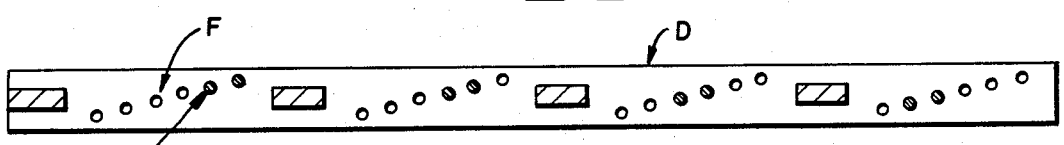
Figure 15:
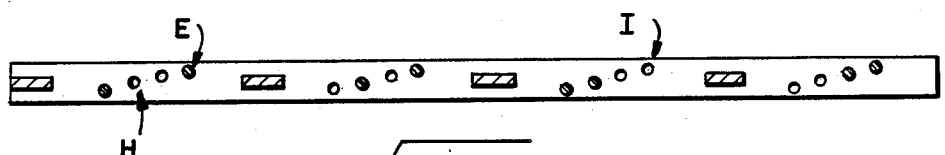
Figure 16:
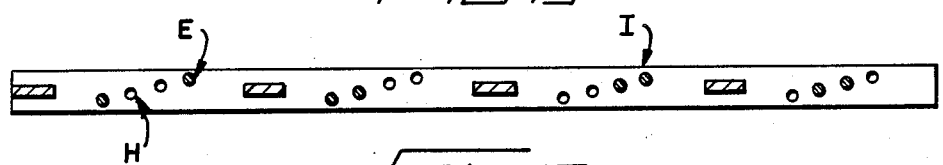
Figure 17:
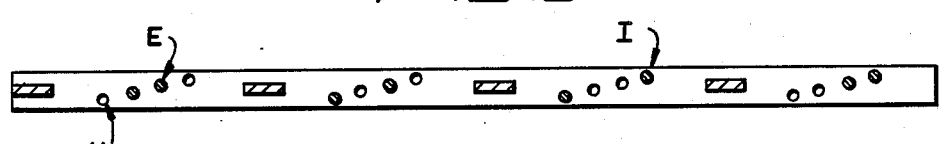
Figure 18:
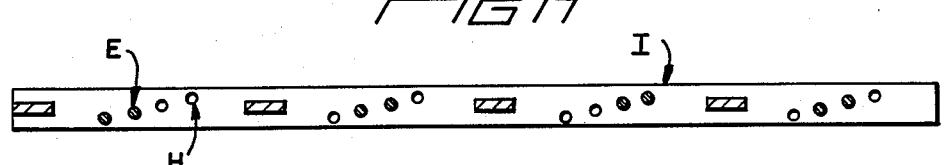

FIGS. 8, 9 and 10

Flexible cutting filament E has a substantially triangular cross-section, as best shown in FIGS. 8, 9 and 10. In the embodiment shown in FIG. 8, surfaces 32, 34 and 36 are substantially equal to each other, while in the embodiment shown in FIG. 9, only surfaces 50 and 52 are equal to each other.

Respective pair of sides 32, 34 and 36 intersect to form respective edge portions 38, 40 and 42, as best shown in FIG. 8. Edge portions 38, 40 and 42 form thin knife edges permitting a cleaner cut of the vegetation as compared to a round flexible cutting filament. Edge portions 38, 40 and 42 are sharp enough for the vegetation, but safe enough for the operator. Edge portions 56, 58 and 60, shown in FIG. 9, are similar to edge portions 38, 40 and 42 in FIG. 8.

Flexible cutting filament E helps create the upward suction necessary to stand the vegetation for cutting and for lifting the cut vegetation for mulching. Flexible cutting filament E is advantageously installed in rims D or I of rotary cutting blade A or G, respectively, such that surface 32 or 52 is a leading surface relative to surface 34 or 54, respectively. Surface 32 or 52, since it is inclined at a positive slope relative to the rotation of rotary cutting member A and G, helps create the upward suction.

Another embodiment of the cutting filament E includes a substantially triangular cross-section with inwardly curving intermediate side surfaces 62, 64 and 66, as best shown in FIG. 10. Side surfaces 62, 64 and 66 are each formed from a circular arc having the same radius.

Edge portions 68, 70 and 72, are formed at each corner of the triangularly shaped cutting element E. Edge portion 68 is formed by two intersecting planar surfaces 74 and 76. Edge portions 70 and edge portion 72 are likewise formed by respective intersecting planar surfaces 78 and 80 and 82 and 84. Respective surfaces 74 and 78, 80 and 82, and 76 and 84 are coplanar. Inwardly curving surfaces 62, 64 and 66 provide a narrower profile for edge portion 68, 70 and 72 thereby improving its cutting characteristic.

FIGS. 11 through 18

Various installation configurations for cutting filament E in holes F for the embodiment shown in FIG. 1, and holes G in the embodiment shown in FIG. 5 are indicated. Positions occupied by first portion 28 and second portion 30 of cutting filaments E, are represented by filled in circles in the FIGS. 11 through 18. A person skilled in the art will understand that there is numerous combinations of installing cutting filament E in rim D or rim I for providing at least three cutting heights relative to the ground.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:
1. An apparatus for holding a plurality of flexible cutting filaments for cutting grass and the like, comprising:
   (a) a rotary member;
   (b) said rotary member including a hub having means for mounting said rotary member to a drive means;
   (c) said rotary member including a continuous rim disposed around said hub;
   (d) said rotary member including means for securing said hub to said rim; and
   (e) said rim including at least three stepped openings at different elevations relative to the ground, for securing at least three flexible cutting filament to said rim, thereby providing at least three cutting planes when said rotary member is rotating.
2. An apparatus, as in claim 1, wherein:
   (a) said openings are disposed radially on said rim.
3. An apparatus, as in claim 2, wherein:
   (a) said openings are disposed circumferentially around said rim.
4. An apparatus, as in claim 1, wherein:
   (a) said rim is cylindrical.
5. An apparatus, as in claim 4, wherein:
   (a) said rim defines an enclosed volume; and
   (b) said hub and said rim securing means are disposed within said enclosed volume.
6. An apparatus, as in claim 5, wherein:
   (a) said rim securing means includes at least an arm means having first and second ends; and
   (b) said first end is operably associated with said hub and said second end with said rim.
7. An apparatus, as in claim 1, wherein:
   (a) said rim securing means includes a plurality of arm means extending circumferentially and radially from said hub.
8. An apparatus, as in claim 7, wherein:

(a) each of said plurality of arm means includes first and second ends; and
(b) each of said arm means first end is operably associated with said hub and said arm means second end with said rim.

9. An apparatus, as in claim 8, wherein:
(a) each pair of adjacent arm means and said rim define an opening.

10. An apparatus, as in claim 9, wherein:
(a) said at least three stepped openings are disposed in said rim between adjacent arm means.

11. An apparatus for cutting grass and the like, comprising:
(a) a rotary member;
(b) said rotary member including a hub having means for mounting said rotary member to drive means;
(c) said rotary member including a continuous rim disposed around said hub;
(d) said rotary member including means for securing said rim to said hub;
(e) a plurality of flexible cutting filaments being operably associated with and extending outwardly from said rim; and
(f) means for securing said flexible cutting filaments to said rim for providing at least three cutting planes when said rotary member is rotating.

12. An apparatus, as in claim 11, wherein:
(a) said rim includes a plurality of openings for securing said flexible cutting filaments thereto; and
(b) at least three of said plurality of openings are vertically spaced apart.

13. An apparatus, as in claim 12, wherein:
(a) said plurality of openings are in groups; and
(b) openings in each of said groups are circumferentially and vertically disposed from each other.

14. An apparatus, as in claim 13, wherein:
(a) each of said groups includes at least first and second openings.

15. An apparatus, as in claim 14, wherein:
(a) each of said plurality of flexible filaments is associated with each of said groups of openings.

16. An apparatus, as in claim 15, wherein:
(a) each of said plurality of flexible cutting filaments includes first and second portions; and
(b) said first portion is associated with said first opening and said second portion is associated with said second opening.

17. An apparatus, as in claim 16, wherein:
(a) said triangular cross-section includes concave side portions.

18. An apparatus as in claim 17, wherein:
(a) said triangular cross-section includes edge portions; and
(b) said edge portions are knife-edged.

19. An apparatus as in claim 18, wherein:
(a) said edge portions each includes first and second planar surfaces intersecting at an angle;
(b) said concave side portions extend between respective pair of said edge portions; and
(c) said concave side portions are arcuate.

20. An apparatus, as in claim 11, wherein:
(a) each of said plurality of flexible cutting filaments has a substantially triangular cross-section.

21. A cutting element for attachment to a rotary member in a lawn mower or the like for cutting grass and the like, comprising:
(a) a flexible filament;
(b) said filament being substantially triangular in cross-section;
(c) said triangular cross-section including edge portions;
(d) said edge portions are knife-edged;
(e) said edge portions each including first and second planar surfaces intersecting at an angle;
(f) said triangular cross-section including concave side portions extending between respective pair of said edge portions; and
(g) means for securing said flexible filament to a rotary member.

* * * * *